(12) United States Patent
Kim et al.

(10) Patent No.: US 8,709,651 B2
(45) Date of Patent: Apr. 29, 2014

(54) BINDER FOR SECONDARY BATTERY PROVIDING EXCELLENT ADHESION STRENGTH AND CYCLE PROPERTY

(75) Inventors: Ok Sun Kim, Daejeon (KR); Young-Min Kim, Daejeon (KR); MinAh Kang, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/574,043

(22) PCT Filed: Jan. 19, 2011

(86) PCT No.: PCT/KR2011/000395
§ 371 (c)(1),
(2), (4) Date: Oct. 3, 2012

(87) PCT Pub. No.: WO2011/090318
PCT Pub. Date: Jul. 28, 2011

(65) Prior Publication Data
US 2013/0122364 A1    May 16, 2013

(30) Foreign Application Priority Data
Jan. 20, 2010 (KR) .................. 10-2010-0005132

(51) Int. Cl.
*H01M 4/13* (2010.01)
*H01M 4/62* (2006.01)
*H01M 4/02* (2006.01)
*H01M 4/00* (2006.01)

(52) U.S. Cl.
USPC .............................. 429/217; 429/209; 429/66

(58) Field of Classification Search
None
See application file for complete search history.

(56) References Cited

U.S. PATENT DOCUMENTS

| 6,733,927 B1 | 5/2004 | Takezawa et al. | |
| 2002/0058749 A1* | 5/2002 | Larson et al. | 524/807 |
| 2008/0076026 A1* | 3/2008 | Ryu et al. | 429/189 |

FOREIGN PATENT DOCUMENTS

| JP | 10-2000-0048387 A | 7/2000 |
| KR | 10-2000-0048387 A | 7/2000 |
| KR | 10-2000-0075953 | 12/2000 |
| KR | 10-2006-0004685 | 1/2006 |
| KR | 10-0642082 | 11/2006 |
| KR | 10-2007-0023141 A | 2/2007 |
| KR | 10-2008-0034219 | 4/2008 |
| KR | 10-2009-0109649 A | 10/2009 |
| KR | 10-2009-0125782 | 12/2009 |

OTHER PUBLICATIONS

International Search Report for Application No. PCT/KR2011/00395 dated Sep. 27, 2011.
Korean Office Action for Application No. 10-2010-0005132 dated Jan. 20, 2012.
Korean Notice of Allowance for Application No. 10-2010-0005132 dated May 9, 2012.

* cited by examiner

*Primary Examiner* — Yoshitoshi Takeuchi
(74) *Attorney, Agent, or Firm* — Lerner, David, Littenberg, Krumholz & Mentlik, LLP

(57) ABSTRACT

Provided is a binder for secondary battery electrodes comprising a copolymer consisting of 79 to 98% by weight of at least one selected from the group consisting of (a) an ethylenically unsaturated carbonic acid ester monomer and (b) a vinyl monomer and a nitrile monomer, (c) 1 to 20% by weight of an ethylenically unsaturated carbonic acid monomer, and (d) 1 to 20% by weight of a phosphorus (P)-containing monomer including a P=O bond and one or more reactive double bonds in a molecular structure thereof, based on the total weight of the binder. The binder fundamentally improves stability of an electrode in the process of fabricating the electrode, thus providing secondary batteries with superior cycle properties.

13 Claims, No Drawings

BINDER FOR SECONDARY BATTERY PROVIDING EXCELLENT ADHESION STRENGTH AND CYCLE PROPERTY

CROSS REFERENCE TO RELATED APPLICATIONS

The present application is a national phase entry under 35 U.S.C. §371 of International Application No. PCT/KR2011/000395, filed Jan. 19, 2011, published in English, which claims priority from Korean Patent Application No. 10-2010-0005132 filed Jan. 20, 2010, all of which are incorporated herein by reference.

TECHNICAL FIELD

The present invention relates to a binder for secondary battery electrodes. More specifically, the present invention relates to a binder for secondary battery electrodes comprising a copolymer consisting of 79 to 98% by weight of at least one selected from the group consisting of (a) an ethylenically unsaturated carbonic acid ester monomer and (b) a vinyl monomer and a nitrile monomer; (c) 1 to 20% by weight of an ethylenically unsaturated carbonic acid monomer; and (d) 1 to 20% by weight of a phosphorus (P)-containing monomer including a P=O bond and one or more reactive double bonds in a molecular structure thereof, based on the total weight of the binder.

BACKGROUND ART

Rapidly increasing use of fossil fuels has led to an increase in demand for use of alternative or clean energy. In light of such trends, generation and storage of electricity using electrochemical reaction are a very active area of research.

In recent years, representative examples of electrochemical devices using electrochemical energy are secondary batteries, and application thereof continues to expand.

Recently, technological development and increased demand associated with portable equipment such as portable computers, cellular phones and cameras have brought about an increase in the demand for secondary batteries as energy sources. Among these secondary batteries, lithium secondary batteries having high energy density and voltage, long lifespan and low self-discharge have been actively researched and are commercially available and widely used.

In addition, increased interest in environmental issues has brought about a great deal of research associated with electric vehicles, hybrid electric vehicles or the like as alternatives to vehicles using fossil fuels such as gasoline vehicles and diesel vehicles. These electric vehicles and hybrid electric vehicles generally use nickel-metal hydride secondary batteries as power sources. However, a great deal of study associated with lithium secondary batteries with high energy density and discharge voltage is currently underway and some are commercially available.

Conventional typical lithium secondary batteries use graphite as an anode active material. Lithium ions of a cathode are repeatedly intercalated into and de-intercalated from the anode to realize charge and discharge. The theoretical capacity of batteries may vary depending upon the type of the electrode active material, but generally cause deterioration in charge and discharge capacity in the course of the cycle life of the battery.

The primary reason behind such phenomenon is that separation between an electrode active material, or separation between the electrode active material and a collector due to volume variation in the electrode as batteries in the course of charging and discharging results in insufficient realization of function of the active material. In addition, in the process of intercalation and de-intercalation, lithium ions intercalated into the anode cannot be sufficiently de-intercalated and active sites of the anode are thus decreased. For this reason, charge/discharge capacity and lifespan of batteries may decrease in the course of cycles.

In particular, in order to improve discharge capacity, in the case where natural graphite having a theoretical discharge capacity of 372 mAh/g is used in combination with a material such as silicon, tin or silicon-tin alloys having high discharge capacity, volume expansion of the material considerably increases, in the course of charging and discharging, thus causing isolation of the anode material from the electrode material. As a result, battery capacity disadvantageously rapidly decreases over repeated cycles.

Accordingly, there is an increasing demand in the art for binder and electrode materials which can prevent separation between the electrode active material, or between the electrode active material and the collector upon fabrication of electrodes via strong adhesion and can control volume expansion of electrode active material upon repeated charging/discharging via strong physical properties, thus improving battery performance.

Polyvinylidene difluoride (PVdF), which is generally used as a binder of cathodes and anodes, is a polymer resin dissolved in an organic solvent such as N-methyl-2-pyrrolidone (NMP). Although PVdF was not developed as an adhesive, it is generally used as a binder of electrode active materials, since it exhibits superior miscibility with a graphite material and realizes formation of an electrode plate with superior adhesion strength when added in about an amount of 8 to 10% of the graphite.

However, since PVdF covers an active material in a state in which polymer fibers are packed, the electrode active material deteriorates inherent battery performance in terms of capacity and efficiency. In addition, in the case where a material having a large specific surface area like natural graphite or metallic active materials and exhibiting high expansion and contraction ratio upon charging and discharging is used as an electrode active material, the bond may be readily cleaved or cycle properties may be deteriorated due to insufficient flexibility of PVdF. Furthermore, PVdF absorbs a carbonate electrolyte and then swells, thus causing deterioration in output capacity in the course of cycles.

Another binder used for lithium secondary batteries as an aqueous binder is rubber-based latex such as styrene-butadiene rubber (SBR). SBR is environmentally friendly, reduces the amount of binder used and improves the capacity of secondary batteries and initial charge/discharge efficiency. However, in this case, adhesion persistency is improved due to elasticity of the rubber, but adhesion strength is not greatly increased. Accordingly, SBR entails restriction in use such as inapplicability to active materials with high capacity which exhibit great volume expansion when charged/discharged and require electrodes with high adhesion strength.

Accordingly, there is an increasing need for development of binders to improve cycle properties of batteries, structural stability of electrodes and adhesion strength.

DISCLOSURE OF INVENTION

Technical Problem

Therefore, the present invention has been made to solve the above and other technical problems that have yet to be resolved.

As a result of a variety of extensive and intensive studies and experiments to solve the problems as described above, the inventors of the present invention have developed a binder for secondary battery electrodes comprising a copolymer based on a predetermined amount of an ethylenically unsaturated carbonic acid ester monomer, a predetermined amount of vinyl monomer, a predetermined amount of nitrile monomer, a predetermined amount of ethylenically unsaturated carbonic acid monomer, and a predetermined amount of phosphorus (P)-containing monomer including a P=O bond and one or more reactive double bonds in a molecular structure thereof, based on the total weight of the binder, and then confirmed that use of this binder contributes to improvement in cycle properties of batteries and adhesion strength.

The present invention was completed based on this discovery.

Technical Solution

Accordingly, the binder for secondary battery electrodes according to the present invention comprises a copolymer consisting of 79 to 98% by weight of at least one selected from the group consisting of (a) an ethylenically unsaturated carbonic acid ester monomer and (b) a vinyl monomer and a nitrile monomer; (c) 1 to 20% by weight of an ethylenically unsaturated carbonic acid monomer; and (d) 1 to 20% by weight of a phosphorus (P)-containing monomer including a P=O bond and one or more reactive double bonds in a molecular structure thereof, based on the total weight of the binder.

The binder according to the present invention exhibits improved cycle properties due to high adhesion strength based on combination of the specific components when used as a binder for battery electrodes, in particular, in the case where an electrode active material having great volume expansion upon charging/discharging is used.

For example, the ethylenically unsaturated carbonic acid ester monomer may be at least one monomer selected from the group consisting of methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethyl hexyl acrylate, hydroxy propyl acrylate, lauryl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethyl hexyl methacrylate, hydroxy propyl methacrylate, lauryl methacrylate, methyl crotonate, ethyl crotonate, propyl crotonate, butyl crotonate, isobutyl crotonate, n-amyl crotonate, isoamyl crotonate, n-hexyl crotonate, 2-ethyl hexyl crotonate, hydroxy propyl crotonate, dimethylaminoethyl methacrylate and diethylaminoethyl methacrylate.

For example, the vinyl monomer may be at least one selected from the group consisting of styrene, o-, m- and p-methylstyrene, α-methylstyrene, β-methylstyrene, 2,4-dimethylstyrene, o-, m- and p-ethylstyrene, p-t-butylstyrene, divinyl benzene, vinyl naphthalene and mixtures thereof.

Examples of the nitrile monomer include succinonitrile, sebaconitrile, fluoronitrile, chloronitrile, acrylonitrile, methacrylonitrile and the like. More preferably, the nitrile monomer is at least one selected from the group consisting of acrylonitrile, methacrylonitrile and mixtures thereof.

For example, the ethylenically unsaturated carbonic acid monomer is at least one selected from the group consisting of unsaturated monocarbonic acid monomers such as acrylic acid, methacrylic acid, crotonic acid and isocrotonic acid and unsaturated dicarbonic acid monomers such as maleic acid, fumaric acid, citraconic acid, mesaconic acid, glutaconic acid and itaconic acid and acid anhydrides thereof. Of these, monoethylenically unsaturated monocarbonic acid such as acrylic acid and methacrylic acid is preferred.

As mentioned above, the phosphorus (P)-containing monomer includes a P=O bond and one or more reactive double bonds in a molecular structure thereof. In the case where the phosphorus (P)-containing monomer includes two or more reactive double bonds, it also serves as a cross-linking agent of the copolymer. That is, one of the reactive double bonds is polymerized with another monomer to form a copolymer and the other of reactive double bonds (s) reacts with another copolymer to form a molecular cross-link.

In a preferred embodiment, the phosphorus (P)-containing monomer is a monomer represented by Formula 1 below:

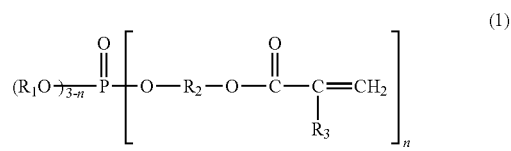

(1)

wherein $R_1$ and $R_3$ each independently represent hydrogen or methyl, $R_2$ represents $C_1$-$C_{10}$ alkyl and n represents an integer of 1 to 3.

Preferably, in Formula 1, n represents an integer of 1 or 2.

More preferred is a monomer in which $R_1$ represents hydrogen, $R_2$ represents an ethylene group and $R_3$ represents a methyl group.

In the configuration, (a) the ethylenically unsaturated carbonic acid ester monomer and (b) at least one monomer selected from the group consisting of vinyl and nitrile monomers may be present in a molar ratio of 1:10 to 10:1. More preferred is a molar ratio of 5:5 to 9:1.

The binder according to the present invention may be prepared by emulsion polymerization using the monomers. The polymerization temperature and polymerization period may be suitably determined depending on the type of polymerization method or polymerization initiator, and for example, the polymerization temperature may be from about 50° C. to 200° C. and the polymerization period may be from about 1 to about 20 hours.

Examples of the emulsifying agent used for emulsion polymerization include oleic acid, stearic acid, lauric acid, fatty acid salts such as sodium or potassium salts of mixed fatty acids and general anionic emulsifying agents such as rosin acid. Preferably, a reactive emulsifying agent to improve stability of latex may be added. The emulsifying agent may be used alone or in combination thereof.

In addition, the polymerization initiator for emulsion polymerization may be an inorganic or organic peroxide and examples thereof include water-soluble initiators including potassium persulfate, sodium persulfate and ammonium persulfate, and oil-soluble initiators including cumene hydroperoxide and benzoyl peroxide. In addition, an activating agent to promote initiation reaction of peroxide may be further included with the polymerization initiators. For example, the activating agent may be at least one selected from the group consisting of sodium formaldehyde sulfoxylate, sodium ethylenediaminetetraacetate, ferrous sulfate, dextrose and combinations thereof.

Preferably, the phosphorus (P)-containing monomer is added after the other monomers in the process of polymerization, to increase the density of phosphorus functional groups on the surface of binder particles. The increased number of phosphorous functional groups on the surfaces of the binder particles increases the possibility of metal surface bonding and thus improves adhesion strength.

In a specific embodiment, the phosphorus (P)-containing monomer may be added 0.2 to 3 hours before reaction completion, preferably 0.5 to 1.5 hours before reaction completion.

The present invention provides an electrode for secondary batteries in which an electrode active material and a conductive material are bonded to a collector by the binder for electrodes.

The electrode of the present invention exhibits superior adhesion strength of the electrode mixture (such as the electrode active material, conductive material, binder) to the collector. This superior adhesion strength is provided by chemically bonding O=P—O—$R_1$ derived from the phosphorus (P)-containing monomer in the binder to the metal surface (M-OH) of the electrode current collector. That is, the phosphorus acid group (O=P—O—) reacts with the metal (M) to form a phosphorus acid-metal chemical bond (O=P—O-M).

This electrode may be fabricated by adding a binder, an electrode active material and a conductive material to a predetermined solvent such as water or NMP to prepare a slurry and applying the slurry to the collector, followed by drying and rolling. The electrode active material will be described in more detail.

The electrode for secondary batteries may be a cathode or an anode. For example, the cathode is fabricated by applying a mixture of a cathode active material, a conductive material and a binder to a cathode current collector, followed by drying. The anode is fabricated by applying a mixture of an anode active material, a conductive material and a binder on an anode current collector, followed by drying.

The electrode active material is a material causing electrochemical reaction in the electrode and is divided into a cathode active material and an anode active material depending on the type of electrode.

The cathode active material includes two or more transition metals as lithium transition metal oxides and examples thereof include, but are not limited to, layered compounds such as lithium cobalt oxide ($LiCoO_2$) or lithium nickel oxide ($LiNiO_2$) substituted with one or more transition metals; lithium manganese oxide substituted with one or more transition metals; lithium nickel oxide represented by the formula of $LiNi_{1-y}M_yO_2$ (in which M=Co, Mn, Al, Cu, Fe, Mg, B, Cr, Zn or Ga and includes one or more elements among the elements, $0.01 \leq y \leq 0.7$); lithium nickel cobalt manganese composite oxides represented by $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$ or $Li_{1+z}Ni_{0.4}Mn_{0.4}Co_{0.2}O_2$ (in which $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si or Y, A=F, P or Cl); and olivine lithium metal phosphate represented by the formula of $Li_{1+x}M_{1-y}M'_yPO_{4-z}X_z$ (in which M=transition metal, preferably Fe, Mn, Co or Ni, M'=Al, Mg or Ti, X=F, S or N, $-0.5 \leq x \leq +0.5$, $0 \leq y \leq 0.5$, and $0 \leq z \leq 0.1$).

Examples of the anode active material include carbon and graphite materials such as natural graphite, artificial graphite, expanded graphite, carbon fiber, hard carbon, carbon black, carbon nanotubes, perylene, activated carbon; metals alloyable with lithium, such as Al, Si, Sn, Ag, Bi, Mg, Zn, In, Ge, Pb, Pd, Pt and Ti and compounds containing these elements; composites of carbon and graphite materials with a metal and a compound thereof; and lithium-containing nitrides. Of these, a carbon-based active material, a silicon-based active material, a tin-based active material, or a silicon-carbon-based active material are more preferred. The material may be used alone or in combination of two or more thereof.

The conductive material serves to further improve the electrode active material and is commonly added in an amount of 0.01 to 30% by weight, based on the total weight of the electrode mix. Any conductive material may be used without particular limitation so long as it has suitable conductivity without causing adverse chemical changes in the fabricated secondary battery. Examples of conductive materials that can be used in the present invention include conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives. The current collector in the electrode is a material causing electrochemical reaction and is divided into a cathode current collector and an anode current collector depending on the type of electrode.

The cathode current collector is generally fabricated to have a thickness of 3 to 500 µm. There is no particular limit to the cathode current collector, so long as it has suitable conductivity without causing adverse chemical changes in the fabricated battery. As examples of the cathode current collector, mention may be made of stainless steel, aluminum, nickel, titanium, sintered carbon, and aluminum or stainless steel surface-treated with carbon, nickel, titanium, silver or the like.

The anode current collector is generally fabricated to have a thickness of 3 to 500 µm. There is no particular limit to the anode current collector, so long as it has suitable conductivity without causing adverse chemical changes in the fabricated battery. As examples of the anode current collector, mention may be made of copper, stainless steel, aluminum, nickel, titanium, sintered carbon, and copper or stainless steel surface-treated with carbon, nickel, titanium or silver, and aluminum-cadmium alloys.

These current collectors have a thickness of 3 to 500 µm and include fine irregularities on the surface thereof so as to enhance adhesion to electrode active materials. In addition, the current collectors may be used in various forms including films, sheets, foils, nets, porous structures, foams and nonwoven fabrics.

The mixture (electrode mix) of an electrode active material, a conductive material and a binder may further comprise at least one selected from the group consisting of a viscosity controller and a filler.

The viscosity controller controls the viscosity of electrode mix so as to facilitate mixing of the electrode mix and application thereof to the collector and may be added in an amount of 30% by weight, based on the total weight of the electrode mix. Examples of the viscosity controller include, but are not limited to, carboxymethyl-cellulose, polyacrylic acid and polyvinylidene fluoride. If necessary, the solvent may also serve as a viscosity controller.

The filler is a component used to inhibit expansion of the electrode. There is no particular limit to the filler, so long as it does not cause adverse chemical changes in the fabricated battery and is a fibrous material. As examples of the filler, there may be used olefin polymers such as polyethylene and polypropylene; and fibrous materials such as glass fibers and carbon fibers.

The present invention also provides a lithium secondary battery comprising the electrode for secondary batteries.

The lithium secondary battery generally further comprises a separator and a lithium salt-containing non-aqueous electrolyte, in addition to the electrodes.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and a lithium salt.

As the non-aqueous electrolytic solution that can be used in the present invention, for example, mention may be made of non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

The lithium salt is a material that is readily soluble in the above-mentioned non-aqueous electrolyte and may include, for example, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic carboxylic acid lithium, lithium tetraphenyl borate and imides.

An organic solid electrolyte or an inorganic solid electrolyte may be used, if necessary.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH and Li$_3$PO$_4$—Li$_2$S—SiS$_2$.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas, fluoro-ethylene carbonate (FEC), propene sultone (PRS) or fluoro-ethlene carbonate (FEC)

The lithium secondary batteries may be used as power sources of electric vehicles, hybrid electric vehicles and the like, requiring long cycle life and high charge/discharge rate.

Advantageous Effects

As apparent from the fore-going, the binder for secondary battery electrodes according to the present invention comprises a copolymer prepared by combination of specific monomers and thus provides improved cycle properties and high adhesion strength.

BEST MODE FOR CARRYING OUT THE INVENTION

Now, the present invention will be described in more detail with reference to the following Examples. These examples are provided only to illustrate the present invention and should not be construed as limiting the scope and spirit of the present invention.

Comparative Example 1

Butyl acrylate (65 g), styrene (30 g) and acrylic acid (5 g) as monomers were added to water containing sodium lauryl sulfate as an emulsifying agent and potassium persulfate as a polymerization initiator, and these ingredients were mixed and polymerized at 70° C. for about 5 hours. A binder for secondary battery electrodes containing polymer particles obtained by polymerizing monomers was prepared through polymerization.

Comparative Example 2

A binder for secondary battery electrodes was prepared in the same manner as in Comparative Example 1 except that 2-ethylhexylacrylate was used as the monomer, instead of butylacrylate.

Comparative Example 3

A binder for secondary battery electrodes was prepared in the same manner as in Comparative Example 1 except that nitrile was used as the monomer, instead of styrene.

Comparative Example 4

A binder for secondary battery electrodes was prepared in the same manner as in Comparative Example 1 except that itaconic acid was used as the monomer, instead of acrylic acid.

Comparative Example 5

A binder for secondary battery electrodes was prepared in the same manner as in Comparative Example 1 except that the content of butylacrylate was varied to 80 g and the content of styrene was varied to 10 g.

Example 1

A binder for secondary battery electrodes was prepared in the same manner as in Comparative Example 1 except that 3 g of a phosphorus-containing monomer (di-methacryloyloxyethyl phosphate) was further added as a monomer.

Example 2

A binder for secondary battery electrodes was prepared in the same manner as in Example 1 except that the content of the phosphorus-containing monomer was 5 g.

Example 3

A binder for secondary battery electrodes was prepared in the same manner as in Example 1 except that the content of the phosphorus-containing monomer was 10 g.

Example 4

A binder for secondary battery electrodes was prepared in the same manner as in Comparative Example 1 except that the addition of 3 g of the phosphorus-containing monomer was conducted one hour before completion of the reaction.

Example 5

A binder for secondary battery electrodes was prepared in the same manner as in Comparative Example 2 except that 5 g of a phosphorus-containing monomer was further added as a monomer.

Example 6

A binder for secondary battery electrodes was prepared in the same manner as in Comparative Example 3 except that 5 g of a phosphorus-containing monomer was further added as a monomer.

Example 7

A binder for secondary battery electrodes was prepared in the same manner as in Comparative Example 4 except that 5 g of a phosphorus-containing monomer was further added as a monomer.

Example 8

A binder for secondary battery electrodes was prepared in the same manner as in Comparative Example 5 except that 5 g of a phosphorus-containing monomer was further added as a monomer.

Experimental Example 1

Measurement of Gel Content

Gel content is a measure of binder cross linking, which may be indicated by a percentage of insolubility in an electrolyte. The polymer binder according to the present invention was dried at 80° C. for 24 hours or longer, about 0.1 g of the polymer binder was weighed ($M_a$) and immersed in 5 g of an electrolyte (EC:PC:DEC=3:2:5, weight ratio) for 24 hours or longer. The binder immersed in the electrolyte was filtered on a 200 mesh whose weight is known and dried at 80° C. for 24 hours or longer, and the weight ($M_b$) of the binder left on the mesh was measured and a gel content was calculated from the following equation.

$$\text{Gel content}(\%) = M_b/M_a * 100$$

Evaluation was based on an average of three or more values for respective binders.

TABLE 1

| | Content of phosphorus (P)-containing monomer (g) | Gel content (%) |
|---|---|---|
| Ex. 1 | 3 | 93 |
| Ex. 2 | 5 | 99 |
| Ex. 3 | 10 | 99 |
| Ex. 4 | 3 (one hour before reaction completion) | 93 |
| Ex. 5 | 5 | 98 |
| Ex. 6 | 5 | 99 |
| Ex. 7 | 5 | 97 |
| Ex. 8 | 5 | 99 |
| Comp. Ex. 1 | 0 | 80 |
| Comp. Ex. 2 | 0 | 81 |
| Comp. Ex. 3 | 0 | 84 |
| Comp. Ex. 4 | 0 | 76 |
| Comp. Ex. 5 | 0 | 80 |

As can be seen from Table 1 above, electrodes employing the binders of Examples 1 to 8 according to the present invention had high gel content (%), as compared to electrodes employing the binders of Comparative Examples 1 to 5. Polymerizable double bonds enabling cross linking and present in the phosphorous containing monomer are believed to be the cause of the high gel content.

Experimental Example 2

Adhesion Strength Test

In the case where the polymer binder according to the present invention was used as a cathode binder or an anode binder for lithium secondary batteries, adhesion strength between the electrode active material and the collector was measured.

In the case where the binder of Comparative Example 1 and the binder of Examples 1 to 4 were applied to a cathode, a cathode active material ($LiCoO_2$), a conductive material, a viscosity controller and a binder were added in a ratio of 92:5:1:2 to prepare a slurry, the slurry was coated on an Al foil and dried in a 60° C. oven for 24 hours or longer to fabricate a cathode. In addition, in the case where the binder was applied to an anode, an anode active material (graphite), a conductive material, a viscosity controller and a binder were added in a ratio of 96:1:1:2 to prepare a slurry, the slurry was coated on Cu foil and dried in a 60° C. oven for 24 hours or longer to fabricate an anode.

The surfaces of the cathode and anode thus fabricated were cut and fixed to a slide glass and peel strength was measured at 180° C. while the collector was peeled off. The results thus obtained are shown in Table 2. Evaluation was based on an average of five or more values for respective binders.

TABLE 2

| | Content of phosphorus (P)-containing monomer (g) | Adhesion strength of cathode (g/in) | Adhesion strength of anode (g/in) |
|---|---|---|---|
| Ex. 1 | 3 | 30 | 50 |
| Ex. 2 | 5 | 42 | 78 |
| Ex. 3 | 10 | 43 | 86 |
| Ex. 4 | 3 (one hour before completion of reaction) | 41 | 75 |
| Ex. 5 | 5 | 47 | 82 |

TABLE 2-continued

|  | Content of phosphorus (P)-containing monomer (g) | Adhesion strength of cathode (g/in) | Adhesion strength of anode (g/in) |
|---|---|---|---|
| Ex. 6 | 5 | 45 | 77 |
| Ex. 7 | 5 | 38 | 70 |
| Ex. 8 | 5 | 40 | 76 |
| Comp. Ex. 1 | 0 | 6 | 15 |
| Comp. Ex. 2 | 0 | 10 | 17 |
| Comp. Ex. 3 | 0 | 8 | 22 |
| Comp. Ex. 4 | 0 | 8 | 16 |
| Comp. Ex. 5 | 0 | 7 | 17 |

As can be seen from Table 2 above, electrodes using the binders of Example 1 to 8 according to the present invention exhibited considerably high adhesion strength, as compared to electrodes using binders of Comparative Example 1 to 5. This behavior was the same in the cathode and the anode. In particular, as can be seen from Example 4, adhesion strength was increased, since when the phosphorus (P)-containing monomer was added in the later reaction, the amount of phosphorus functional group present on the surface of binder particles increased and thus increased the possibilty of bonding the phosphorus functional group to the metal surface. Meanwhile, in the case where the content of phosphorus (P)-containing monomer was 5 g or higher, there was no great variation in adhesion strength. As a result, it was considered that the content of phosphorus (P)-containing monomer was preferably about 5 g.

Experimental Example 3

Cycle Property Test

A coin-shaped battery (coin-half cell) was fabricated using Li metal as a reference electrode, cathodes and anodes prepared in Experimental Example 2, and an electrolyte containing 1M $LiPF_6$ in a mixed solvent of EC:DMC:DEC=1:2:1. That is, batteries using a combination of the cathode prepared in Experimental Example 2 and Li metal as a reference electrode and batteries using a combination of the anode prepared in Experimental Example 2 and Li metal as a reference electrode were fabricated.

Variation in charge/discharge property of respective coin batteries thus fabricated was tested using a charge/discharge measuring apparatus. The first cycle discharge capacity and efficiency of the batteries were measured at 0.2 C charge and 0.2 C discharge, 50 charge/discharge cycles were conducted at 1 C charge and 1 C discharge, and maintenance (%) of $50^{th}$ cycle capacity to the $1^{st}$ (initial) capacity was measured. The results thus obtained are shown in Tables 3 and 4 below.

TABLE 3

Cathode cycle properties

|  | Discharge capacity of $1^{st}$ cycle (mAh/g) | Efficiency of $1^{st}$ cycle (%) | Efficiency of $50^{th}$ cycle (%) |
|---|---|---|---|
| Ex. 1 | 124 | 98 | 92 |
| Ex. 2 | 123 | 99 | 96 |
| Ex. 3 | 124 | 98 | 93 |
| Ex. 4 | 123 | 99 | 94 |
| Ex. 5 | 124 | 99 | 95 |
| Ex. 6 | 123 | 98 | 94 |
| Ex. 7 | 122 | 97 | 93 |
| Ex. 8 | 123 | 98 | 95 |
| Comp. Ex. 1 | 110 | 93 | 80 |
| Comp. Ex. 2 | 110 | 92 | 78 |
| Comp. Ex. 3 | 111 | 91 | 79 |
| Comp. Ex. 4 | 107 | 91 | 77 |
| Comp. Ex. 5 | 109 | 93 | 79 |

TABLE 4

Anode cycle properties

|  | Discharge capacity of $1^{st}$ cycle (mAh/g) | Efficiency of $1^{st}$ cycle (%) | Efficiency $50^{th}$ cycle (%) |
|---|---|---|---|
| Ex. 1 | 344 | 97 | 90 |
| Ex. 2 | 342 | 97 | 93 |
| Ex. 3 | 347 | 98 | 93 |
| Ex. 4 | 350 | 99 | 95 |
| Ex. 5 | 349 | 99 | 92 |
| Ex. 6 | 347 | 98 | 94 |
| Ex. 7 | 341 | 96 | 91 |
| Ex. 8 | 351 | 99 | 95 |
| Comp. Ex. 1 | 311 | 88 | 82 |
| Comp. Ex. 2 | 302 | 85 | 77 |
| Comp. Ex. 3 | 308 | 87 | 71 |
| Comp. Ex. 4 | 310 | 88 | 69 |
| Comp. Ex. 5 | 314 | 89 | 75 |

As can be seen from Tables 3 and 4, the batteries of Examples 1 to 8 using the binder according to the present invention exhibited at least 90% capacity maintenance, as compared to the initial capacity, even after 50 cycles. This behavior was the same in the case where the binder was applied to the cathode and in the case where the binder was applied to the anode. This is the reason that large volume variation of the electrode active material upon charge/discharge was inhibited by strong adhesion strength of the binder of the present invention, and variation at the interface between the active materials was thus greatly inhibited, an increase in resistance was small and intercalation of active materials was prevented by superior adhesion strength between the active materials and the collector.

On the other hand, it was confirmed that, for the batteries of Comparative Examples 1 to 5, the binder cannot withstand the volume variation, resulting in considerably decreased capacity, and the electrode was often detached and thus exhibited decreased stability due to deteriorated adhesion strength of an electrode in the process of fabricating the electrode.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A lithium secondary battery comprising an electrode, wherein the electrode comprises:
   an electrode mixture including an electrode active material, a conductive material, and a binder; and
   an electrode collector,
   wherein the electrode active material and the conductive material are bonded to the electrode collector by the binder, wherein the binder comprises:
a copolymer, the copolymer consisting of:
(i) 79 to 98% by weight of
(a) an ethylenically unsaturated carbonic acid ester monomer and
(b) at least one selected from the group consisting of a vinyl monomer and a nitrile monomer;
(ii) 1 to 20% by weight of an ethylenically unsaturated carbonic acid monomer; and
(iii) 1 to 20% by weight of a phosphorus (P)-containing monomer including a P=O bond and one or more reactive double bonds in a molecular structure thereof, based on the total weight of the binder, and
wherein an adhesion strength between the electrode mixture and the collector ranges from 30 grams per inch (g/in) to 86 g/in, wherein the adhesive strength was measured by attaching the electrode to a glass surface and measuring the adhesion strength as the electrode collector is peeled away from the electrode mixture at 180° C.

2. The lithium secondary battery according to claim 1, wherein the ethylenically unsaturated carbonic acid ester monomer is at least one monomer selected from the group consisting of methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethyl hexyl acrylate, hydroxy propyl acrylate, lauryl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethyl hexyl methacrylate, hydroxy propyl methacrylate, lauryl methacrylate, methyl crotonate, ethyl crotonate, propyl crotonate, butyl crotonate, isobutyl crotonate, n-amyl crotonate, isoamyl crotonate, n-hexyl crotonate, 2-ethyl hexyl crotonate, hydroxy propyl crotonate, dimethylaminoethyl methacrylate and diethylaminoethyl methacrylate.

3. The lithium secondary battery according to claim 1, wherein the vinyl monomer is at least one selected from styrene, o-, m- and p-methylstyrene, α-methylstyrene, β-methylstyrene, 2,4-dimethylstyrene, o-, m-, and p-ethylstyrene, p-t-butylstyrene, divinyl benzene and vinyl naphthalene.

4. The lithium secondary battery according to claim 1, wherein the nitrile monomer is at least one monomer selected from succinonitrile, sebaconitrile, fluoronitrile, chloronitrile, acrylonitrile and methacrylonitrile monomers.

5. The lithium secondary battery according to claim 1, wherein the ethylenically unsaturated carbonic acid monomer is at least one selected from the group consisting of unsaturated monocarbonic acid monomers such as acrylic acid, methacrylic acid, crotonic acid and isocrotonic acid, unsaturated dicarbonic acid monomers such as maleic acid, fumaric acid, citraconic acid, mesaconic acid, glutaconic acid and itaconic acid and acid anhydrides thereof.

6. The lithium secondary battery according to claim 1, wherein the phosphorus (P)-containing monomer includes two or more reactive double bonds and wherein the phosphorus (P)-containing monomer is a cross-linking agent of the copolymer.

7. The lithium secondary battery according to claim 1, wherein the phosphorus (P)-containing monomer is a monomer represented by Formula 1 below:

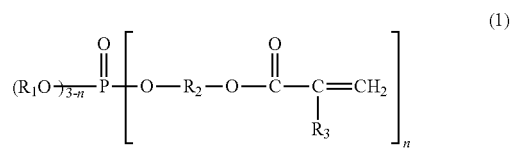

$R_1$ and $R_3$ each independently represent hydrogen or methyl;
$R_2$ represent $C_1$-$C_{10}$ alkyl; and
n represents an integer of 1 to 3.

8. The lithium secondary battery according to claim 7, wherein n is an integer of 1 to 2.

9. The lithium secondary battery according to claim 7, wherein $R_1$ represents hydrogen, $R_2$ represents an ethylene group and $R_3$ represents a methyl group.

10. The lithium secondary battery according to claim 1, wherein the ethylenically unsaturated carbonic acid ester monomer and the vinyl monomer are mixed in a ratio of 1:10 to 10:1.

11. The lithium secondary battery according to claim 1, wherein a P—O bond derived from the phosphorus (P)-containing monomer in the binder is chemically bonded to a metal surface of the electrode collector.

12. The lithium secondary battery according to claim 1, wherein the electrode active material is a lithium transition metal oxide powder or carbon powder.

13. The lithium secondary battery according to claim 1, wherein the electrode collector has a thickness of 3 to 200 μm and has a surface with fine irregularities.

* * * * *